United States Patent
Degioanni

(10) Patent No.: US 11,277,320 B2
(45) Date of Patent: Mar. 15, 2022

(54) AUTOMATIC PROVISIONING OF MONITORING FOR CONTAINERIZED MICROSERVICES

(71) Applicant: Sysdig, Inc., San Francisco, CA (US)

(72) Inventor: Loris Degioanni, Davis, CA (US)

(73) Assignee: SYSDIG, INC., San Francisco, CA (US)

( * ) Notice: Subject to any disclaimer, the term of this patent is extended or adjusted under 35 U.S.C. 154(b) by 0 days.

(21) Appl. No.: 17/236,880

(22) Filed: Apr. 21, 2021

(65) Prior Publication Data
US 2021/0243089 A1 Aug. 5, 2021

Related U.S. Application Data

(63) Continuation of application No. 16/585,591, filed on Sep. 27, 2019, now Pat. No. 11,025,512, which is a continuation of application No. 15/297,070, filed on Oct. 18, 2016, now Pat. No. 10,454,789.

(60) Provisional application No. 62/243,602, filed on Oct. 19, 2015.

(51) Int. Cl.
| | | |
|---|---|---|
| *G06F 15/16* | (2006.01) | |
| *H04L 41/50* | (2022.01) | |
| *H04L 41/5041* | (2022.01) | |
| *H04L 43/045* | (2022.01) | |
| *H04L 41/22* | (2022.01) | |

(52) U.S. Cl.
CPC ...... *H04L 41/5058* (2013.01); *H04L 41/5041* (2013.01); *H04L 43/045* (2013.01); *H04L 41/22* (2013.01)

(58) Field of Classification Search
CPC . H04L 41/5058; H04L 41/5041; H04L 41/22; H04L 43/045
USPC .......................................................... 709/224
See application file for complete search history.

(56) References Cited

U.S. PATENT DOCUMENTS

| | | | |
|---|---|---|---|
| 7,941,762 B1* | 5/2011 | Tovino | G06F 15/17306 715/816 |
| 9,210,056 B1* | 12/2015 | Choudhary | G06F 16/24565 |
| 9,396,456 B1* | 7/2016 | Wang | G06Q 10/10 |
| 10,069,782 B2* | 9/2018 | Jayam | H04L 51/22 |
| 2007/0283002 A1* | 12/2007 | Bornhoevd | G06F 8/60 709/224 |
| 2008/0104032 A1* | 5/2008 | Sarkar | G06F 16/958 |
| 2008/0239979 A1* | 10/2008 | Chou | G06F 11/3495 370/252 |
| 2009/0049177 A1* | 2/2009 | Iszlai | G06Q 10/06375 709/226 |
| 2011/0052155 A1* | 3/2011 | Desmarais | H04N 21/4788 386/290 |

(Continued)

OTHER PUBLICATIONS

Degioanni, U.S. Appl. No. 16/585,591, filed Sep. 27, 2019, Office Action, dated Oct. 16, 2020.

*Primary Examiner* — Hamza N Algibhah
(74) *Attorney, Agent, or Firm* — Hickman Becker Bingham Ledesma LLP

(57) ABSTRACT

When it is detected that microservices have been created at a computing cluster running the microservices in containers, a respective monitoring subsystem is assigned to each microservice. Monitoring data for each of the microservices is then collected via the respective monitoring subsystems. Respective graphical user interfaces are then provided presenting at least a portion of the respective monitoring data for each microservice.

20 Claims, 3 Drawing Sheets

(56) References Cited

U.S. PATENT DOCUMENTS

| | | | |
|---|---|---|---|
| 2011/0225463 A1* | 9/2011 | Davis | G06F 9/485 714/47.3 |
| 2011/0314326 A1* | 12/2011 | Mahajan | G06F 11/2035 714/4.11 |
| 2012/0058742 A1* | 3/2012 | Razoumov | H04W 48/18 455/406 |
| 2013/0290188 A1* | 10/2013 | Olliphant | G06Q 20/405 705/44 |
| 2013/0339123 A1* | 12/2013 | Ennis | G06Q 30/0225 705/14.26 |
| 2014/0068549 A1 | 3/2014 | Friedman | |
| 2014/0173398 A1* | 6/2014 | Beust | G06F 40/143 715/205 |
| 2014/0278624 A1* | 9/2014 | Steiner | G06Q 10/107 705/7.12 |
| 2014/0304399 A1 | 10/2014 | Chaudhary | |
| 2015/0067147 A1* | 3/2015 | Carmel | G06F 11/3495 709/224 |
| 2015/0117234 A1 | 4/2015 | Raman | |
| 2015/0170045 A1* | 6/2015 | Kirkham | G06Q 10/06 706/11 |
| 2015/0350349 A1* | 12/2015 | Kao | H04L 67/18 709/204 |
| 2016/0028855 A1 | 1/2016 | Goyal | |
| 2016/0094483 A1 | 3/2016 | Johnston | |
| 2016/0142262 A1* | 5/2016 | Werner | H04L 41/22 709/224 |
| 2016/0142475 A1 | 5/2016 | Kathuria | |
| 2016/0241448 A1 | 8/2016 | Uriel | |
| 2016/0380832 A1 | 12/2016 | Purushotham | |
| 2017/0249059 A1* | 8/2017 | Houseworth | G06F 16/2428 |
| 2018/0026856 A1* | 1/2018 | Yang | H04L 41/5019 709/224 |
| 2019/0286462 A1* | 9/2019 | Bodnick | G06Q 10/06316 |
| 2020/0252743 A1* | 8/2020 | Bellhy | H04W 4/029 |
| 2020/0412732 A1* | 12/2020 | Muthukrishnan | H04L 63/105 |

\* cited by examiner

AUTOMATIC PROVISIONING OF MONITORING FOR CONTAINERIZED MICROSERVICES

BENEFIT CLAIM

This application claims the benefit as a continuation of U.S. application Ser. No. 16/585,591 filed Sep. 27, 2019, which is a continuation of U.S. application Ser. No. 15/297,070 filed Oct. 18, 2016, now U.S. Pat. No. 10,454,789 issued Oct. 22, 2019; which claims priority under to U.S. provisional application No. 62/243,602, filed Oct. 19, 2015, the entire contents of each of which is hereby incorporated by reference for all purposes as if fully set forth herein.

FIELD OF THE DISCLOSURE

The present disclosure generally relates to management monitoring of computer program applications and components of those applications termed services. The disclosure relates more specifically to computer-implemented techniques for automatically establishing monitoring services for other computer program applications or services in response to detecting that the services have been instantiated or created.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Managing computer program applications running on networked computing devices typically involves some aspect of monitoring the applications. Monitoring can involve collecting application messages and other data traffic that the applications emit toward a network, directed at peer instances of the applications, directed at servers, or directed at client computing devices.

Many monitoring configurations include facilities to poll metrics from applications and infrastructure monitoring components. Some metric polling frameworks are embedded in specific languages or runtime environments; for example, JAVA offers the JMX framework. Some other frameworks, like NAGIOS or COLLECTD, involve running monitoring scripts that actively query the system or other process and create metrics that can be collected and visualized. Scripts can be written in any suitable scripting language and can interact with the operating system and with the processes running on it.

Whether through a language-specific framework or through a script, metric polling can involve actions such as getting data from the web interface of an application to retrieve its status, trying to connect to a socket to check the availability of an infrastructure component, opening a directory to count the number of files it contains, reading information from a file, or retrieving information from a pipe or a UNIX socket, among others.

Containerization has emerged as a popular alternative to virtual machine instances for developing computer program applications. With containerization, computer program code can be developed once and then packaged in a container that is portable to different platforms that can manage and run the containers. Consequently, containerization permits faster software development for the same program for multiple different platforms that would otherwise require separate source branches or forks, or at least different compilation and execution environments. The DOCKER containerization system from Docker, Inc. of San Francisco, Calif. has emerged as a popular choice for containerization architecture. However, containerization also can impose constraints on inter-program communications.

The word "microservices" describes a modular way to architect applications, so that they are split into independent units (i.e., "services") which communicate through application programming interfaces (APIs) and well-defined interfaces. Microservices bring many benefits, such as reduction of the number of points of failure; a structure that enables multiple teams to work concurrently on the same application and supports continuous delivery; better separation of concern and responsibility; and scalability.

Further information about microservices is available online at the time of this writing in the article "Microservices" in the "wiki" folder of the domain "en.wikipedia.org" and the present disclosure presumes that the reader is knowledgeable about microservices at least to the extent set forth in the foregoing article.

Microservices have been adopted by many enterprises in the past, but we are now seeing a big push toward them, driven by the rise of containerization technologies like Docker. Several orchestration frameworks (Kubernetes, Mesos, Amazon ECS and several others) are gaining prominence as platforms to build the next generation of microservices. In this document, we will focus on Kubernetes to have a practical example and make the description easier. However, the concepts we describe can be applied to any orchestration framework, including the ones that are not based on containers.

Kubernetes is an open-source system for managing containerized applications across multiple hosts in a cluster. Kubernetes supports multiple virtual clusters backed by the same physical cluster. These virtual clusters are called "namespaces". Kubernetes provides mechanisms for application deployment, scheduling, updating, maintenance, and scaling. A key feature of Kubernetes is that it actively manages the containers to ensure that the state of the cluster continually matches the user's intentions. A user should be able to launch a microservice, letting the scheduler find the right placement. This means that typically the containers implementing a service are scattered across multiple physical/virtual machines.

In Kubernetes, all containers run inside pods. A pod can host a single container, or multiple cooperating containers; in the latter case, the containers in the pod are guaranteed to be co-located on the same machine and can share resources. Pods and services are described through YAML configuration files. The cluster master node interprets these files and takes care of starting and running the services they describe.

Kubernetes exposes its complete interface through an API. This means that anything in Kubernetes can be controlled and observed through API calls. Users can attach to most Kubernetes objects arbitrary key-value pairs called labels. Each resource also has a map of string keys and values that can be used by external tooling to store and retrieve arbitrary metadata about this object, called annotations. Further information about Kubernetes is available in the document "namespaces.html" at the path /v1.0/docs/user-guide of the domain kubernetes.io.

Microservice-based infrastructure tends to be complex, distributed, modular and have many "owners". This means that managing them in a monolithic way tends to be confusing and inefficient. With monolithic monitoring, for example, typically one person is responsible to establish a monitoring process for each system that is created or instantiated, and clusters are monitored. Taking monitoring as an example, observing a full Kubernetes cluster is overwhelming and typically not very useful. It would be more useful for the owner (and the stakeholders) of a specific service to have a focused view on it. This view should be optimized to reflect the service type and user. Its creation should require minimal intervention.

This is not easily achievable today because of the distributed and fluid nature of services: anyone in the organization can create or delete one at any point in time. As a result, monitoring, security, compliance, logging, and network management are still heavily monolithic today. Tuning them to reflect the services structure requires a lot of manual work and is often unfeasible.

SUMMARY

The appended claims may serve as a summary of the invention.

DETAILED DESCRIPTION

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

In an embodiment, a data processing method comprises transmitting, from a monitoring computer system that is programmed for monitoring one or more services, a request for information relating to new services to a cluster of computing nodes that are managing the one or more services; receiving from the cluster of nodes an indication that a new service not included in the one or more services has been created; in response to receiving the indication, creating a monitoring subsystem for monitoring the new service; assigning the monitoring subsystem to the new service; sending access information for the monitoring subsystem to one or more user computers. Other aspects and features of various embodiments will become apparent from the entire disclosure as described in other sections herein.

1. Implementation Example—Structure and Processing—Service-Oriented Monitoring

Figure 1:
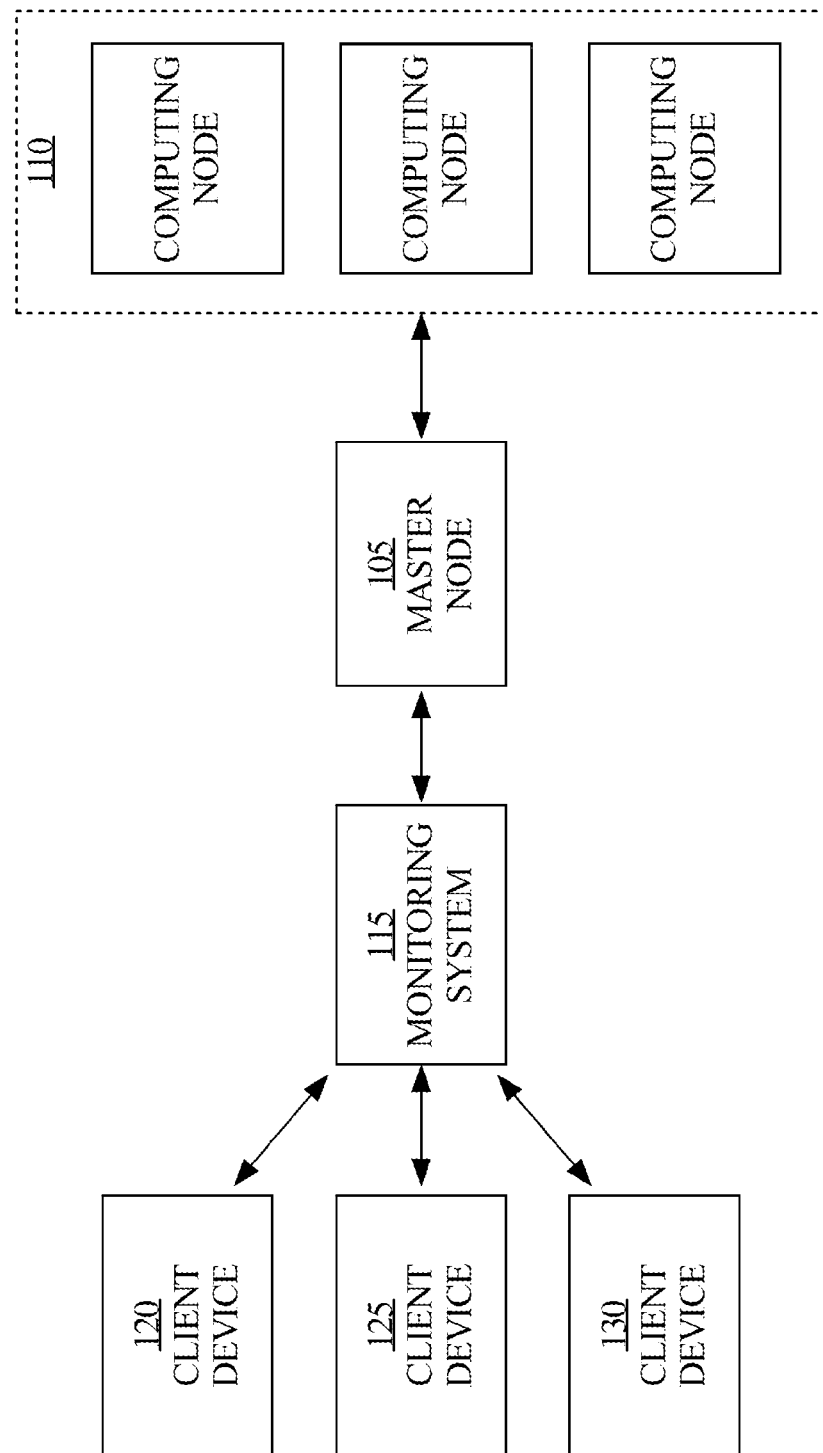
FIG. 1 illustrates an example computer network according to an embodiment.

FIG. 1 illustrates an example computer data communications network that is structured and programmed to implement one embodiment of the techniques herein.

In some embodiments, the network 100 is a Kubernetes cluster. The network 100 comprises a master node 105, which may also act as a server such as an API server, a plurality of computing nodes 110, a monitoring system 115, and client devices 120, 125, 130. Each of the master node 105 and the computing nodes 110 may comprise different computers, cores, processors, or processes in one or more computers, clusters, or virtual machine instances, in a database local to the owner or operator, or in a shared datacenter or cloud computing environment. Each of the computing nodes 110 can run one or more containers.

The network 100 may be configured to run one or more microservices using the one or more containers. For example, a first microservice may have three containers, with each being run on a different computing node 110. A second microservice may have two containers, with each also being run on a different computing node 110.

The monitoring system 115 may be connected to the master node 105 through an API that the master node 105 implements. Using the API, the monitoring system 115 can issue calls in a pre-arranged format, for example over HTTP (Hypertext Transfer Protocol), to obtain information about the master node 105 and the computing nodes 110, including the number of microservices and their containers. Alternatively, the API may be "push" based. That is, the master node 105 may send change information to the monitoring system 115 without receiving a call from the monitoring system 115.

2. Example Service-Oriented Monitoring Process

Figure 2:
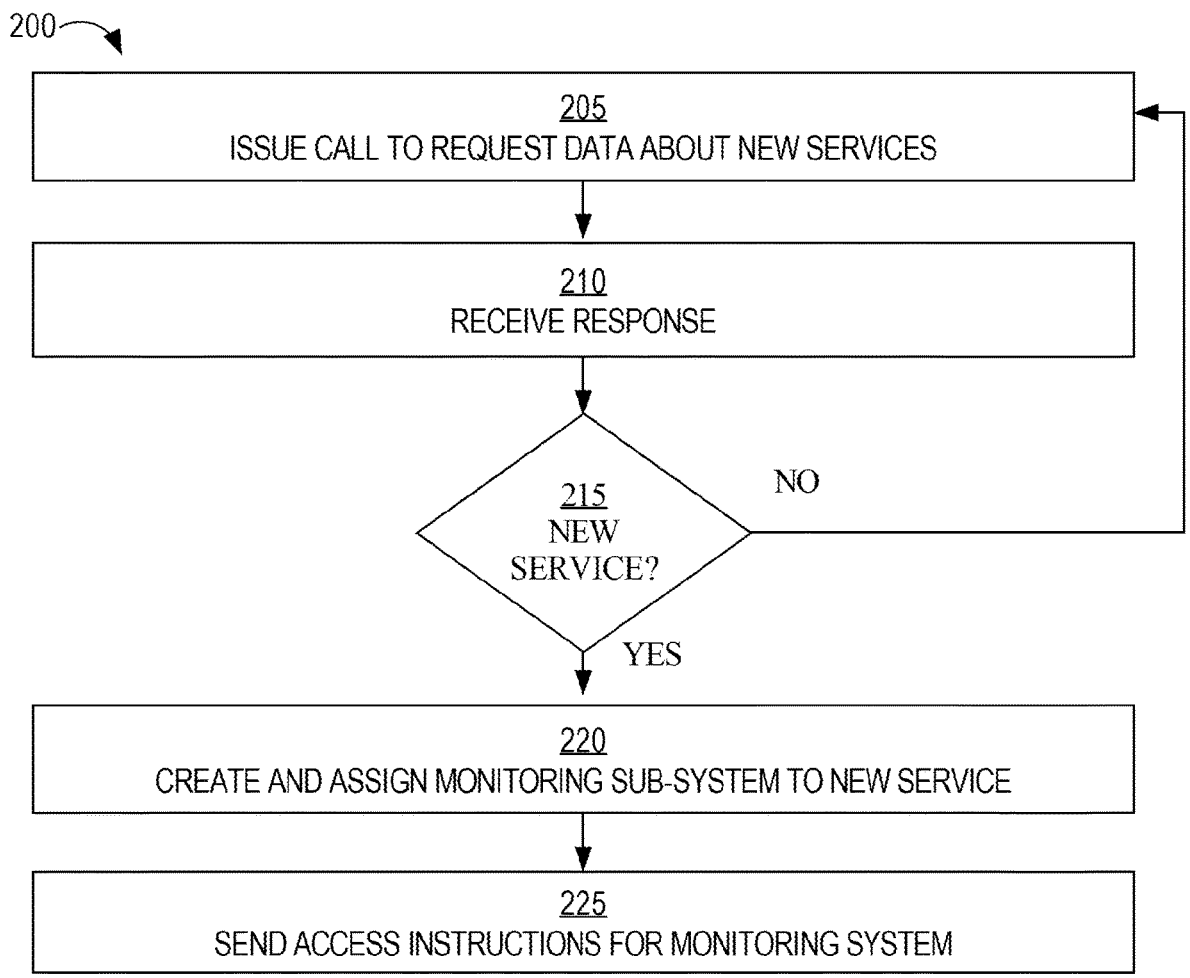
FIG. 2 illustrates an example process for performing service-oriented monitoring, according to some embodiments and provides an example algorithm for programming.

FIG. 2 illustrates an example process for performing service-oriented monitoring. FIG. 2 is a flow diagram that is disclosed at the level of detail and using the terms of communication that are customarily used by persons of the level of skill in the art to whom this disclosure is directed. FIG. 2 may be used as a plan or algorithm that serves as a basis for writing program instructions to implement, by execution using a computer, the process represented in the drawing.

At step 205, the process 200 involves issuing a call to request data about new services. In an embodiment, the master node 105 may be instructed by a user to start a new service. Continuing the example above, the new service may be a third microservice and may be made up of two containers. The master node 105 may schedule the two containers on two different computing nodes 110.

TABLE 1, below, is a code-level example of creating a service using MYSQL (My Structured Query Language).

TABLE 1

Example of Service Creation Using MYSQL

```
YAML file
apiVersion: v1
kind: Service
metadata:
    name: mysql
    labels:
        name: mysql
spec:
    ports:
        - port: 3306
          targetPort: 3306
    selector:
        name: mysql
        app: demo
        role: mysqldb
Command Line
kubectl create -f mysql.yaml
```

The monitoring system 115 may issue an API call to the master node 105 to request data about new services. For example, the monitoring system 115 may periodically issue an API call to request data about all new microservices that have been instantiated or created. At step 210, the process 200 may involve receiving a response to the issued call. For example, the API call may return from the master node 105 a "true" response if a new microservice has been created, and further API calls can be used to gather details. At decision block 215, the process 200 may involve determining whether a new service has been created based on the received response. If a new service has been created (e.g., if the master node 105 sent a "true" response), the process 200 may continue to step 220. If a new service has not been created (e.g., if the master node 105 did not send a "true" response), the process 200 may return to step 405 and a new call may be issued. TABLE 2 is a code-level example of a call to detect a service.

At step 220, the process 200 involves, in response to detecting a new service, creating and assigning a monitoring subsystem for monitoring the newly created service. For example, the monitoring system 115 may create and assign the monitoring subsystem. The monitoring subsystem may be part of the monitoring system 115 or may be a separate entity.

In one embodiment, the monitoring system 115 immediately starts configuring monitoring for the new service in response to detecting the new service. In one embodiment, the monitoring system 115 creates a set of charts and dashboards that are specific to the new service, and to the applications and infrastructure components that the new service containers are running. For example, garbage collection metrics could be reported for a Java application, or slow queries could be reported for a database.

The monitoring system 115 may also create alerts and checks that can be used to detect issues in this specific service and its components.

The monitoring system 115 may configure the routing of alerts and checks, or other data, including but not limited to access privileges for charts or dashboards, to the correct users. For example, it ensures that the dashboards and charts are visible or accessible only by the correct users with the correct credentials, and that the alert notifications are received by the correct users. As a result, the monitoring system 115 automatically creates a monitoring subsystem that is configured and customized to cover the new service, and with the correct permissions and access roles for that service.

One benefit is that users who are focused on other services or applications can be excluded from access to alerts, checks or metrics relating to the new service.

At step 225, the process 200 involves sending access instructions to users. For example, the monitoring system 115 and/or monitoring subsystem may send access instructions to one or more of the client devices 120, 125, 130. In an embodiment, after monitoring is configured, the users associated with the new service receive the instructions to access the monitoring subsystem. This can be accomplished by sending the users a URL (if the monitoring subsystem for the service is public), or by sending the users full access credentials (for example username and password). The access instructions may also include other access data.

In an embodiment, the user who originally requests creating the new service also can define and customize the configuration of the monitoring subsystem for the service. In an embodiment, the user can decide the type of reporting. For example, "I want a database latency report", or "I need a topology view", or "I need to compare CPU usage for the containers delivering this service".

In an embodiment, the monitoring system 115 provides a graphical user interface from which the user can select one or more reports, views or metrics that are useful in monitoring a particular service, and assign those reports, views, or metrics to that service.

In an embodiment, each configuration described herein, such as selecting the type of reporting, results in creating and storing one or more annotations, labels, and namespaces in a YAML configuration file of a service. TABLE 3 below provides an example. The Kubernetes system natively implements means for accessing such YAML configuration files of services. Therefore, the labels and annotations of a microservice configuration are accessible by the monitoring system 115 through the Kubernetes API and can be used for automatic setup. These annotations make it possible to declaratively configure monitoring for a specific microservice with no manual monitoring system configuration and no explicit interaction with the monitoring system 115.

TABLE 3

Example YAML service configuration file with monitoring labels or annotations.

```
YAML file
apiVersion: v1
kind: Service
metadata:
    name: mysql
    labels:
        name: mysql
        environment: production /*The Monitoring System may use
this declaration to indicate that these machines are critical and
require better monitoring or more frequent inspection */
    annotations:
/* Begin monitoring configuration */
        monitoring-dashboards: "resource_usage, mysql, top_tables"
        monitoring-user: "ld@sysdig.com"
        monitoring-granularity: "1s"
        alerts: "cpu.used.percent by container.id > 80,
    memory.used.percent by pod.name > 50"
        alert-targets: ld@sysdig.com, devs@sysdig.com /* End of
monitoring configuration */
spec:
ports:
    - port: 3306
        targetPort: 3306
selector:
    name: mysql
    app: demo
    role: mysqldb
API Output
{
    "kind": "Service",
    "apiVersion": "v1",
    "metadata": {
        "name": "mysql",
        "namespace": "default",
        "selfLink": "/api/v1/namespaces/default/services/mysql",
        "uid": "f49ec350-6eea-11e5-b66a-0a7420c38627",
        "resourceVersion": "40763",
        "creationTimestamp": "2015-10-10T01:05:11Z",
        "labels": {
            "environment": "production",
            "name": "mysql"
        },
        "annotations": {
            "alert-targets": "ld@sysdig.com, devs@sysdig.com",
            "alerts": "cpu.used.percent by container.id \u003e 80,
    memory.used.percent by pod.name \u003e 50",
            "monitoring-dashboards": "resource usage, mysql,
        top tables",
            "monitoring-granularity": "1s"
            "monitoring-user": "ld@sysdig.com"
        }
    },
    "spec": {
```

TABLE 3-continued

Example YAML service configuration file
with monitoring labels or annotations.

```
    "ports": [
      {
        "protocol": "TCP",
        "port": 3306,
        "targetPort": 3306,
        "nodePort": 0
      }
    ],
    "selector": {
        "app": "demo",
        "name": "mysql",
        "role": "mysqldb"
    },
    "clusterIP": "10.3.0.176,"
    "type": "ClusterIP",
    "sessionAffinity": "None"
  },
  "status": {
    "loadBalancer": { }
  }
}
```

Alternatively, the monitoring system 115 manages a relational database having a table of service configuration parameters, in which rows represent services and columns represent monitoring attributes of the corresponding service. In such an embodiment, selecting an item from the graphical user interface for a particular service causes storing a value in a column of the database for the row corresponding to that service. Thereafter, at runtime, values in a column of the database are referenced by methods that implement substantive monitoring functions, and thereby control the execution of those methods to perform the functions that have been selected and configured.

In an embodiment, users may be able to determine the type of alerting. Examples include which metrics to watch or which thresholds to use. As with type of reporting, in an embodiment, a user interface may provide widgets with which different alerting techniques, types or metrics may be selected, and selections result in creating annotations, labels or namespaces in the YAML configuration file of the service or storing appropriate attribute values in columns of the database record for the service.

Users may also determine the level of granularity. For example, "I need monitoring to occur every one (1) second."

In an embodiment, users may determine who can see the charts and dashboards for this service. Role-based authentication may be implemented, in which accounts of individual users are associated with roles, and roles are assigned to a service and/or to the metrics, charts or dashboard that represent the monitoring output of the service.

Users may also determine who receives alert notifications for a particular service. Alerting or other notifications can be configured by selecting user identifiers for individual user accounts, or role identifiers.

In an embodiment, users may determine how the notifications are delivered, such as by email, text message, chat, or other media.

3. Use of Templates

In an embodiment, the monitoring configurations could be based on extensible templates. For example, a template named "basic system monitoring" could include a dashboard with CPU, memory and disk I/O utilization and a threshold on CPU usage. To add this dashboard and threshold to a particular service, using the user interface, a user could select the template named "basic system monitoring" and associate the template with the service, resulting in creating and storing an annotation specifying the template "basic system monitoring" in the YAML configuration file for the service. Annotating a service with the "basic system monitoring" label would make it very easy for a user to include this kind of monitoring.

Templates could be extended and combined for easier usage. For example, the monitoring system 115 may implement a template join function with which a user may select two templates for joining or merging, which are then associated with a new merged template name. The template name of the merged template could be associated with a specified service.

4. Applications Other than Monitoring

For purposes of illustrating a clear example, this disclosure has focused on performance monitoring as an application of the techniques herein. However, the techniques described in this disclosure also can be applied to other performance management areas such as security, compliance, logging, and network management.

As an example, when a service is created, a security service may be programmed, like the monitoring system 115, to automatically instantiate a service-specific security service subsystem that is configured to perform security functions that are specific to a service. One service could specify, in the YAML configuration file, performing deep packet inspection on packets forwarded toward the service. Another particular service could specify that user accounts attempting to log in to that service must use two-factor authentication and specify the means or modes of such authentication which would be implemented using the security service subsystem for that service.

The annotations and labels could be consumed by firewalls, log collectors, security monitors or other networking devices to offer contextual and customizable services. For example, firewalls, log collectors, security monitors or other devices could be programmed to read the YAML configuration files for all configured services, to determine which metrics that are locally available are relevant and responsive to the service monitoring configuration, and to push messages containing updates of responsive metrics to the monitoring subsystem for a particular service. Other examples include using annotation to indicate how to collect logs, which level of granularity to use in the collection, and how to report log-based information; using annotation to define firewall rules for a specific service or its components; using annotation to specify the network configuration of a service, including filtered ports and VPN configuration; and using annotation to enforce policies like which files can be read or written or which commands can be executed.

Using this approach, the monitoring subsystem could be supplemented with a wide range of data obtained by numerous distributed devices.

5. Implementation Example—Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
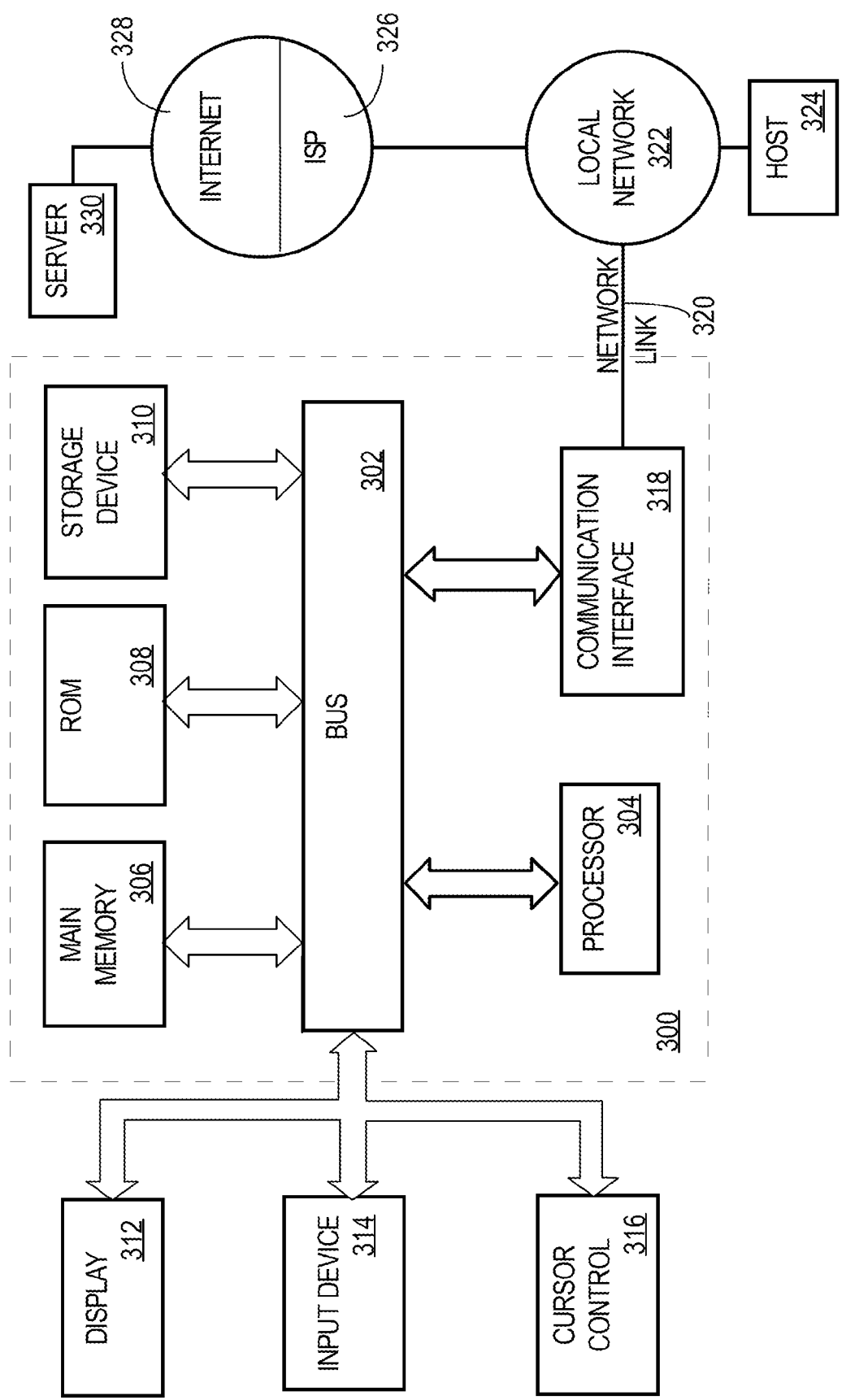
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
    determining that a plurality of microservices have been created at a cluster of a plurality of physical computing nodes, the cluster comprising a plurality of containers running on the plurality of physical computing nodes, each microservice of the plurality of microservices running in one or more respective containers of the plurality of containers;
    assigning a respective monitoring subsystem to each microservice of the plurality of microservices;
    collecting respective monitoring data via the respective monitoring subsystem for each microservice of the plurality of microservices; and
    providing a respective computer graphical user interface presenting at least a portion of the respective monitoring data for each microservice of the plurality of microservices.

2. The method of claim 1, further comprising:
    determining that the plurality of microservices have been created at the cluster of plurality of computing nodes based on:
    issuing an application programming interface call to a particular physical computing node of the cluster; and
    receiving new microservice data from the particular physical computing node, the new microservice data comprising new microservice information related to the plurality of microservices.

3. The method of claim 1, further comprising:
    for each microservice of the plurality of microservices, providing access to the respective computer graphical user interface presenting at least the portion of the respective monitoring data for the microservice based on user credentials associated with the microservice.

4. The method of claim 1, wherein the plurality of containers run in one or more KUBERNETES pods.

5. The method of claim 1, further comprising:
    for each microservice of the plurality of microservices, providing the respective computer graphical user interface presenting at least the portion of the respective monitoring data for the microservice based on a template associated with the microservice.

6. The method of claim 1, further comprising:
    determining that the plurality of microservices have been created at the cluster of plurality of computing nodes based on receiving new microservice data from a particular physical computing node of the cluster, the new microservice data comprising new microservice information related to the plurality of microservices, the new microservice data comprising, for each microservice of the plurality of microservices, an identifier of a KUBERNETES virtual cluster in which the microservice was created; and
    for each microservice of the plurality of microservices, determining the respective computer graphical user interface for the microservice based on the identifier of the KUBERNETES virtual cluster in which the microservice was created.

7. The method of claim 1, wherein a particular microservice of the plurality of microservices runs in two or more containers of the plurality of containers; and wherein the respective computer graphical user interface presenting at least the portion of the respective monitoring data for the particular microservice presents a respective computing performance metric for each container of the two or more containers.

8. A non-transitory storage media storing instructions which, when executed by a processor, cause:
    determining that a plurality of microservices have been created at a cluster of a plurality of physical computing nodes, the cluster comprising a plurality of containers running on the plurality of physical computing nodes, each microservice of the plurality of microservices running in one or more respective containers of the plurality of containers;
    configuring a respective monitoring subsystem for each microservice of the plurality of microservices;
    collecting respective monitoring data via the respective monitoring subsystem for each microservice of the plurality of microservices; and
    providing a respective computer graphical user interface presenting at least a portion of the respective monitoring data for each microservice of the plurality of microservices.

9. The non-transitory storage media of claim 8, further storing instructions which, when executed by the processor, cause:
    determining that the plurality of microservices have been created at the cluster of the plurality of physical computing nodes based on:
    issuing an application programming interface call to a particular physical computing node of the cluster; and
    receiving new microservice data from the particular physical computing node, the new microservice data comprising new microservice information related to the plurality of microservices.

10. The non-transitory storage media of claim 8, further storing instructions which, when executed by the processor, cause:
    for each microservice of the plurality of microservices, providing access to the respective computer graphical user interface presenting at least the portion of the respective monitoring data for the microservice based on user credentials associated with the microservice.

11. The non-transitory storage media of claim 8, wherein the plurality of containers run in one or more virtual clusters.

12. The non-transitory storage media of claim 8, further storing instructions which, when executed by the processor, cause:
    for each microservice of the plurality of microservices, providing the respective computer graphical user interface presenting at least the portion of the respective monitoring data for the microservice based on a template associated with the microservice.

13. The non-transitory storage media of claim 8, further storing instructions which, when executed by the processor, cause:
- determining that the plurality of microservices have been created at the cluster of the plurality of physical computing nodes based on receiving new microservice data from a particular physical computing node of the cluster, the new microservice data comprising new microservice information related to the plurality of microservices, the new microservice data comprising, for each microservice of the plurality of microservices, an identifier of a namespace in which the microservice was created; and
- for each microservice of the plurality of microservices, determining the respective computer graphical user interface for the microservice based on the identifier of the namespace in which the microservice was created.

14. The non-transitory storage media of claim 8, wherein a particular microservice of the plurality of microservices runs in two or more containers of the plurality of containers; and wherein the respective computer graphical user interface presenting at least the portion of the respective monitoring data for the particular microservice presents a respective computing performance metric for each container of the two or more containers.

15. A computing system:
- a processor;
- storage media; and
- instructions stored in the storage media which, when executed by the processor, cause:
- determining that a plurality of microservices have been created at a cluster of a plurality of physical computing nodes, the cluster comprising a plurality of containers running on the plurality of physical computing nodes, each microservice of the plurality of microservices running in one or more respective containers of the plurality of containers;
- configuring a respective monitoring subsystem for each microservice of the plurality of microservices;
- collecting respective monitoring data via the respective monitoring subsystem for each microservice of the plurality of microservices; and
- providing a respective computer graphical user interface presenting at least a portion of the respective monitoring data for each microservice of the plurality of microservices.

16. The computing system of claim 15, further comprising instructions stored in the storage media which, when executed by the processor, cause:
- determining that the plurality of microservices have been created at the cluster of the plurality of physical computing nodes based on:
- issuing an application programming interface call to a particular physical computing node of the cluster; and
- receiving new microservice data from the particular physical computing node, the new microservice data comprising new microservice information related to the plurality of microservices.

17. The computing system of claim 15, further comprising instructions stored in the storage media which, when executed by the processor, cause:
- for each microservice of the plurality of microservices, providing access to the respective computer graphical user interface presenting at least the portion of the respective monitoring data for the microservice based on user credentials associated with the microservice.

18. The computing system of claim 15, wherein the plurality of containers run in one or more virtual clusters.

19. The computing system of claim 15, further comprising instructions stored in the storage media which, when executed by the processor, cause:
- for each microservice of the plurality of microservices, providing the respective computer graphical user interface presenting at least the portion of the respective monitoring data for the microservice based on a template associated with the microservice.

20. The computing system of claim 15, further comprising instructions stored in the storage media which, when executed by the processor, cause:
- determining that the plurality of microservices have been created at the cluster of the plurality of physical computing nodes based on receiving new microservice data from a particular physical computing node of the cluster, the new microservice data comprising new microservice information related to the plurality of microservices, the new microservice data comprising, for each microservice of the plurality of microservices, an identifier of a namespace in which the microservice was created; and
- for each microservice of the plurality of microservices, determining the respective computer graphical user interface for the microservice based on the identifier of the namespace in which the microservice was created.

* * * * *